J. A. DUNCAN.
Barbed Fence-Wire.

No. 218,506. Patented Aug. 12, 1879.

WITNESSES:
C. Neyeux
L. Sedgwick

INVENTOR:
J. A. Duncan
BY Munn & Co.
ATTORNEYS.

UNITED STATES PATENT OFFICE.

JOHN A. DUNCAN, OF KANSAS CITY, MISSOURI.

IMPROVEMENT IN BARBED FENCE-WIRE.

Specification forming part of Letters Patent No. 218,506, dated August 12, 1879; application filed June 20, 1879.

*To all whom it may concern:*

Be it known that I, JOHN A. DUNCAN, of Kansas City, in the county of Jackson and State of Missouri, have invented a new and Improved Barbed-Wire Fence, of which the following is a specification.

The object of this invention is to connect the barb or barbs with the wires, so that they will be held fixed in their places.

It consists in providing the main wire or wires with a loop or loops, and passing the wire barbs through the loops and twisting them together and around the wires, so that they will be at right angles to each other and held immovably in their places.

Figure 1:
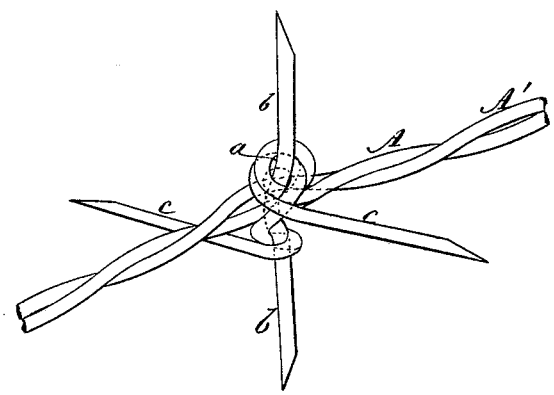
Figure 2:
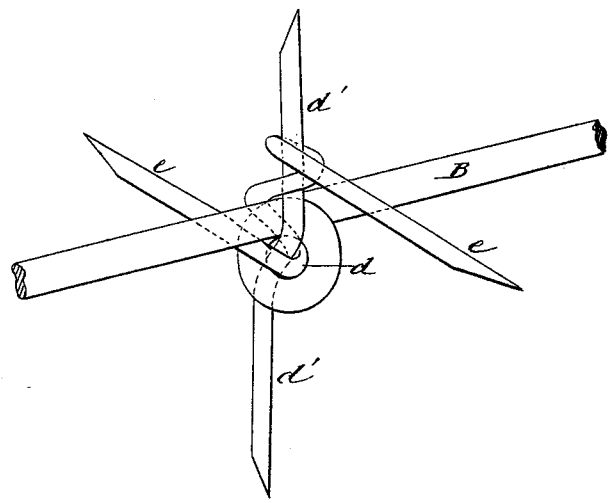

In the accompanying drawings, Figure 1 is a perspective view of my improvement applied to double-twisted wire, and Fig. 2 is a perspective view of the same applied to a single wire.

Similar letters of reference indicate corresponding parts.

Referring to the drawings, A A' are the two twisted fence-wires, in the former of which is made a loop, $a$, by twisting, pressing, bending, or in any other convenient manner. Through the loop thus formed is passed to half its length a wire barb, $b$, with a slight bend in the middle to make it fit over the cross-wire of the loop, and thus allow its two ends to project out at right angles to the wire A.

A second wire barb, $c$, is passed through the loop at right angles to barb $b$. One end is twisted around under the upper wire of the loop, and then brought around so as to project from the side it is entered into the loop and at right angles to barb $b$, while the opposite end is carried downward across wire A diagonally, and then twisted around the lower part of $b$ under the main wire, so as to project out from the opposite side at right angles to barb $b$, but in a line approximately parallel to the opposite end of barb $c$, as shown.

In this arrangement the loop is formed in one of the twisted wires, and one of the barbs is twisted around that part of the wire forming the loop, and also around the other barb, thus connecting the two barbs together and to the wire, so that they cannot change their relative positions nor move from their places on the wire.

In Fig. 2 a single wire, B, is shown with a loop, $d$, formed in it. One bar, $d'$, has two bends at the middle of its length, and is passed through the loop, so that the wires will fall into the bends, and the two ends project out, so that they are parallel to each other and at right angles to the wire. The other barb, $e$, is passed through the loop, and has one end bent around under wire B, so as to project from the side it is entered, while the other end is carried to the upper side of B and given one complete twist around the upper end of barb $d'$, so as to project out at right angles to wire B on the side opposite the other end of this barb.

This arrangement likewise connects the barbs together and to the main wire, so that they cannot change their relative positions, while the loop $d$ prevents them from slipping from their place on the wire.

I do not confine myself to one loop in the fence-wire, nor to the employment of two barbs to each loop; nor do I confine myself to the precise manner shown of twisting the wire barbs to hold them in their relative positions, as these details may be varied without departing from my invention.

Having thus described my invention, I claim as new and desire to secure by Letters Patent—

1. As an improvement in barbed-wire fences, the loop $a$ in the fence-wire, in combination with barbs $b$ $c$, passed through the loop at right angles to each other, the latter wrapped around the main wire and barb $b$ in such a way that the barbs are retained in their relative positions and held immovable on the fence-wire, substantially as described.

2. The combination and arrangement, with the main fence-wire, provided with a suitable loop, $a$, of the barb $b$, passed through the loop, and barb $c$, passed through the loop at right angles to $b$, and having one end carried down under the fence-wire and twisted around barb $b$, and the other end twisted around under the upper wire of loop $a$, so that the two ends of barb $c$ project at right angles to barb $b$ from opposite sides, one above the fence-wire and the other below it, substantially as described.

JOHN ANDREW DUNCAN.

Witnesses:
HENRY H. CRAIG,
WM. L. CHIPMAN.